United States Patent
Ylonen

(10) Patent No.: US 8,666,923 B2
(45) Date of Patent: *Mar. 4, 2014

(54) SEMANTIC NETWORK CLUSTERING INFLUENCED BY INDEX OMISSIONS

(75) Inventor: Tatu J. Ylonen, Espoo (FI)

(73) Assignee: Clausal Computing Oy (FI)

( * ) Notice: Subject to any disclaimer, the term of this patent is extended or adjusted under 35 U.S.C. 154(b) by 186 days.

This patent is subject to a terminal disclaimer.

(21) Appl. No.: 13/196,477

(22) Filed: Aug. 2, 2011

(65) Prior Publication Data

US 2011/0289039 A1    Nov. 24, 2011

Related U.S. Application Data

(63) Continuation of application No. 12/611,179, filed on Nov. 3, 2009, now Pat. No. 8,285,664.

(51) Int. Cl.
*G06F 17/00* (2006.01)
*G06N 5/02* (2006.01)

(52) U.S. Cl.
USPC ............................................................. 706/47

(58) Field of Classification Search
None
See application file for complete search history.

(56) References Cited

U.S. PATENT DOCUMENTS

| | | | | |
|---|---|---|---|---|
| 7,796,059 B2 * | 9/2010 | Ylonen | ............................ | 341/65 |
| 7,937,419 B2 * | 5/2011 | Ylonen | ........................ | 707/813 |
| 7,952,500 B2 * | 5/2011 | Ylonen | ........................ | 341/100 |
| 7,987,214 B2 * | 7/2011 | Ylonen | ........................ | 707/813 |
| 8,244,682 B2 * | 8/2012 | Ylonen | ........................ | 707/657 |
| 8,280,866 B2 * | 10/2012 | Ylonen et al. | ................ | 707/695 |
| 8,285,664 B2 * | 10/2012 | Ylonen | ............................ | 706/47 |
| 8,396,904 B2 * | 3/2013 | Ylonen | ........................ | 707/813 |
| 8,504,355 B2 * | 8/2013 | Ylonen | .............................. | 704/9 |

* cited by examiner

*Primary Examiner* — Michael B Holmes

(57) ABSTRACT

Some links are omitted from indexes associated with semantic network elements and clustering is influenced by such omissions.

13 Claims, 2 Drawing Sheets

SEMANTIC NETWORK CLUSTERING INFLUENCED BY INDEX OMISSIONS

CROSS-REFERENCE TO RELATED APPLICATIONS

This application is a continuation of U.S. patent application Ser. No. 12/611,179, filed Mar. 11, 2009 (currently pending).

INCORPORATION-BY-REFERENCE OF MATERIAL SUBMITTED ON ATTACHED MEDIA

Not Applicable

TECHNICAL FIELD

The present invention relates to knowledge processing systems, particularly data representation using semantic networks.

BACKGROUND OF THE INVENTION

Semantic networks are an old and well-known data representation method. A recent overview of the field and a detailed description of a particular semantic network can be found in H. Helbig: Knowledge Representation and the Semantics of Natural Language, Springer, 2006, which is hereby incorporated herein in its entirety.

A semantic network comprises nodes, typically representing classes and individuals, and links between nodes (or built-in values such as numbers or strings). Links may be unary, binary, ternary, or of other arities. In some semantic networks links may also refer to other links.

Known semantic network based knowledge representation systems have been relatively small scale, with up to some millions or tens of millions of nodes or links. However, for a large scale knowledge processing system, the semantic network may need to scale to billions of nodes, most of which describe individual objects and individual events.

Current semantic networks do not scale well to such sizes. The present invention aims to improve the scalability of semantic network based knowledge representation systems and to improve their performance.

BRIEF SUMMARY OF THE INVENTION

In known semantic network systems, a link is reachable from any node that the link references. That is, links can be followed in any direction.

In contrast, according to the present invention, some links are made unidirectional (or not reachable from one or more of the nodes referenced by the link). This approach goes against traditional wisdom and the assumptions of traditional inference mechanisms, which may evaluate predicates, subgoals or quantifiers in any order (subject to constraints due to extralogical primitives in logic programs). If some links can be followed in only one direction, then a different query strategy that orders operations in such a way that links are only followed in the correct order may need to be used. This adds further complexity to the already difficult problem of making inferences efficiently in very large knowledge bases.

There are many ways to implement making some links unidirectional. In the preferred embodiment, the decision to make a particular link unidirectional or partially unidirectional is made fully automatically based on a set of omission rules. If only a few links reference a node, then the link is likely to be highly relevant for that node. On the other hand, if very many links (especially of the same type) reference a node, then those links are not likely to be particularly relevant for the description of the concept represented by that node. For example, all the links characterizing individual objects as "red" (the color) are likely to be relevant for those individual objects, but not for the description of the concept "red" (which has very many links).

Nodes in semantic networks typically comprise index data structures that can be used to find the links that reference each node. To implement such unidirectional links, some links are omitted from the index of the node at one end of the link. In some embodiments, all links are added, but for some arguments of a link, if the index grows too large or has too many links of a particular type, older and less prominent links are removed from the index. The treatment of arguments may be configured on a per link type (link class) basis. For some links, the first argument is always indexed (i.e., not lossy), whereas other arguments are lossy (automatically forgotten from the respective nodes after many more links have been added, unless something makes the link "prominent").

There are some important benefits to be gained from such approach that outweigh the added complexity in many embodiments. First, index management overhead is reduced (especially if links are not added to the index of very frequently referenced objects at all) and the size of the indexes is reduced, reducing memory consumption, garbage collection overhead, and the time to read/write the knowledge base to disk or database. Also, if indexes are kept relatively small, more efficient and/or simpler data structures can be used for the indexes.

Also, it turns out the added complexity in queries is mostly an illusion. In an interactive system with response time limits it is not practical to follow thousands or millions of links during a query. Instead, queries must be organized in such a way that only a relatively small number of links are followed. Queries that traverse very large indexes are not going to be fast enough anyway. Thus, the change in the way queries must be made is actually much smaller than it initially seems, and largely parallels what needs to be done in general to make inference in semantic networks scale.

Also, many knowledge processing systems may operate for extended periods of time, continuously processing documents, messages, web pages, or other data. If everything the system has ever seen was fully remembered, the system would eventually run out of memory. It is thus necessary to implement forgetting in such systems in some way. The present invention provides one way of doing that.

A further important issue in knowledge bases is clustering data such that objects that are semantically related are stored together, to improve cache locality, and to permit construction of semantic units that can be read or written to disk as one unit or handled in distributed object systems as one unit. Some garbage collectors can also make use of such units to optimize garbage collection performance.

If a link is referenced from all nodes referenced by the link, then it may be difficult to know with which node to cluster the link. However, if the link is referenced from only one node, it is natural to cluster the link with that node. In this manner, the present invention automatically causes links to be clustered with the concepts that they describe, rather than, e.g., the attribute values or class objects that are used as values in the description.

A first aspect of the invention is a computer comprising a semantic network stored in its accessible memory, said semantic network comprising semantic network elements, the computer comprising:

a first omission rule means; and a first index maintainer responsive to the first omission rule means, the first omission rule means causing the first index maintainer to omit at least one link referencing a first node from a first index associated with the first node.

A second aspect of the invention is a computer that further comprises an inference system responsive to the first omission rule means, the first omission rule means causing the inference system to prioritize an inference strategy that avoids trying to follow, from the first node, links that have been omitted from the first index, over an inference strategy that tries to follow such links.

A third aspect of the invention is a method of maintaining an index in a semantic network element, comprising:

adding, by a computer, a plurality of links into an index associated with a semantic network element; and omitting, by the computer, at least one link from the index based on a first omission rule.

A fourth aspect of the invention is a method that further comprises making inferences over the semantic network, prioritizing an inference strategy that avoids trying to follow links from indexes from which some links have been omitted over a strategy that tries to follow links from such indexes.

A fifth aspect of the invention is a computer program product stored on a computer readable medium, the product operable to maintain an index in a semantic network element, and the product comprising:

a computer readable program code means for causing a computer to index a plurality of links into an index associated with a semantic network element; and a computer readable program code means for causing the computer to omit at least one link from the index based on a first omission rule.

A sixth aspect of the invention is a computer program product further comprising a computer readable program code means for causing the computer to make inferences over the semantic network, prioritizing an inference strategy that avoids trying to follow links from indexes from which some links have been omitted over a strategy that tries to follow links from such indexes.

BRIEF DESCRIPTION OF THE SEVERAL VIEWS OF THE DRAWING(S)

DETAILED DESCRIPTION OF THE INVENTION

It is to be understood that the aspects and embodiments of the invention described herein may be used in any combination with each other. Several of the aspects and embodiments may be combined together to form a further embodiment of the invention, and not all features, elements, or characteristics of an embodiment necessarily appear in other embodiments. A method, a computer, or a computer program product which is an aspect of the invention may comprise any number of the embodiments or elements of the invention described herein. Separate references to "an embodiment" or "one embodiment" refer to particular embodiments or classes of embodiments (possibly different embodiments in each case), not necessarily all possible embodiments of the invention. Where an element is specified, the intention is that more than one such element could also be present. First, second, etc., entities may or may not refer to the same entity.

Figure 1:
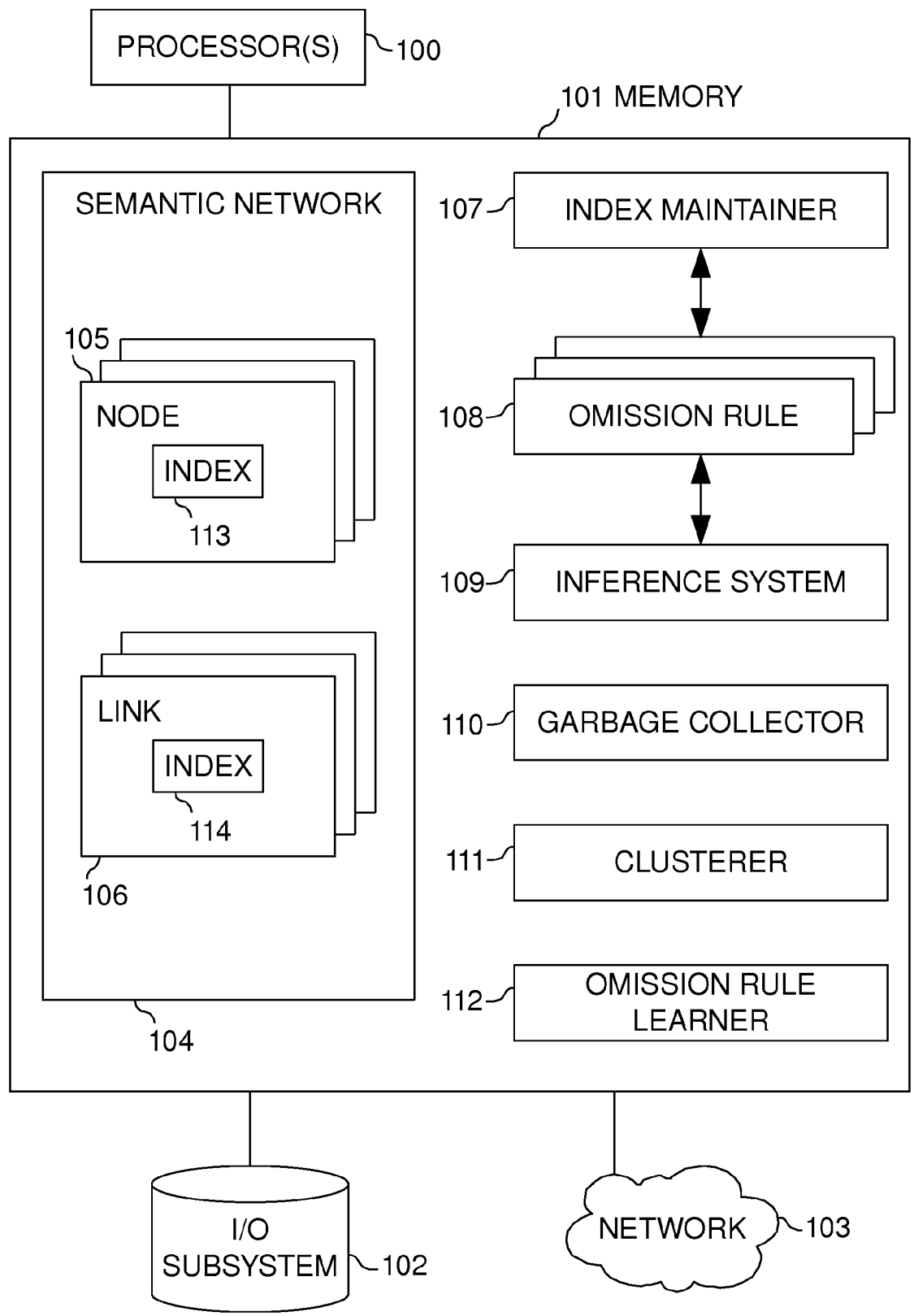
FIG. 1 illustrates a computer according to an embodiment of the invention.

FIG. 1 illustrates a computer according to an embodiment of the invention. A computer may be a general or special purpose computer, workstation, server, laptop, handheld device, smartphone, wearable computer, embedded computer, a system of computers (e.g., a computer cluster), distributed computer, computerized control system, processor, or other apparatus with data processing capability.

(100) illustrates one or more processors in the computer. The processors may be general purpose processors, or they may be, e.g., special purpose chips or ASICs. (101) illustrates the main memory of the computer. (102) illustrates an I/O subsystem, typically comprising mass storage (such as magnetic, optical, or semiconductor disks, tapes or other storage systems, RAID subsystems, etc.; it frequently also comprises a display, keyboard, speaker, microphone, camera, and/or other I/O devices). (103) illustrates a network interface; the network may be, e.g., a local area network, wide area network (such as the Internet), digital wireless network, or a cluster interconnect or backplane joining processor boards and racks within a clustered or blade-based computer. The I/O subsystem and network interface may share the same physical bus or interface to interact with the processor(s) and memory, or may have one or more independent physical interfaces. Additional memory may be located behind and accessible through such interfaces, such as memory stored in various kinds of networked storage (e.g., USB tokens, iSCSI, NAS, file servers, web servers) or on other nodes in a distributed non-shared-memory computer.

(104) illustrates a semantic network in the computer's accessible memory. The semantic network comprises nodes (105) and links (106). Links have one or more arguments that may reference nodes, in some embodiments other links, built-in data types (e.g., strings, numbers), or various other data representations (e.g., pictures or sounds in some embodiments). Together, the nodes and links are called semantic network elements.

At least some of the nodes of the semantic network have an index (113) associated with them. The index can be used to find the links that reference the node. In its simplest form, it may be just a list or array; however, for nodes that have many links (of different types), more complex data structures such as a search tree or a hash table may be used. The format of the index may also depend on the number of links in it; for example, if the index is empty, it could be a NULL pointer; if it contains only one link, it could be just a pointer to that link; if it is relatively small, it could be a vector (array) of pointers to links (or a vector comprising link types and pointers to the respective links), and its format could change to, e.g., a hash table keyed by the link type or some other suitable value if it becomes very big. Each slot in the hash table could again change from a single link to a vector to a more complex index.

In some embodiments of the present invention, some links may also be associated with a similar index (114). Both nodes and links may also have more than one index associated with them, for example an index for links referencing the node in "arg1" position, another for "arg2" position, and so forth (or, e.g., one for "arg1" and another for all the others). (Some semantic network implementations do not call this data structure an index, but still have a corresponding data structure that can be used to find links referencing a node.)

According to the present invention, at least some of the indexes do not comprise all the links referencing the associated node. In other words, some links may be omitted from the indexes based on one or more omission rules. This is in contrast to the known prior art, where the ability to follow the links between nodes has been seen as one of the major benefits of semantic networks. Well known inference mechanisms such as spreading activation depend on this in their normal implementations. Also, known logical inference mechanisms assume that inference can follow the graph in any direction.

Omitting the links is made feasible by using one or more omission rules that affect both the maintenance of the indexes and the inference process. The indexes are maintained by an index maintainer (107), which may be implemented, e.g., using specialized circuitry on an ASIC or using a program code means stored in the computer's memory. The index maintainer is coupled to one or more omission rule means (108), which decides for each link whether it is to be included in each of the indexes associated with the nodes or links that it references. In some embodiments omission rules may also signal to the index maintainer that one or more links already existing in an index should be dropped from the index when adding another link to the index, and this is one way of omitting links from an index. In general, maintaining an index includes adding, removing, and modifying values in the index such that the index is kept up to date with changes to the semantic network.

The omission rule means may also be integrated with the index maintainer so that they form a single logical circuit or program code means. Such integration is preferable in embodiments where no dynamic learning of omission rules takes place. However, in embodiments where the omission rules change dynamically, it may be preferable to separate the index maintainer and the omission rule means into separate modules.

The omission rule means is also coupled to the inference system (109), which makes inferences over the semantic network. The inference system is responsive to the omission rule means, and in an inference process prioritizes inference strategies that avoid using indexes in such a way that the omitted links would need to be found from an index. For example, in finding the individual that is "Mike's car", and assuming that possession is indicated by a two-argument link POSS (OWNER, OBJECT) and the omission rule applicable to "car" causes POSS links referencing "car" by their second argument to be omitted (or at least some of them to be omitted), the inference system would prioritize a strategy that starts from "Mike", and then searches for POSS links where "Mike" is the first argument, over searching for POSS links having "car" as their second argument.

Again, if the omission rules are static, the effect of omission rules may be integrated into the inference means by taking into account the influence of the rules in the inference means. However, if the rules are dynamic, then it may be preferable to keep them separate from the inference means.

(110) illustrates a garbage collector for reclaiming links and nodes that are no longer reachable from the externally referenced roots of the semantic network. The garbage collector may use any known garbage collection technology, including but not limited to reference counting, mark-and-sweep collection, copying garbage collection, generational garbage collection, the train algorithm, or a region-based garbage collector. The implementation of garbage collectors is described in detail in R. Jones and R. Lins: Garbage Collection: Algorithms for Dynamic Memory Management, Wiley, 1996.

In the preferred embodiment, the system is configured such that if a link is dropped from an index by the index maintainer, and the link is no longer in any index, and there is no other (live) link referencing the link, then the garbage collector will automatically reclaim the link (even if it is a part of a garbage cycle, as is known in the garbage collection literature). One requirement for this to happen is that there must not be any references to links besides those occurring through the links. In particular, there can be no global table or hash table referencing the links, unless such table or hash table is weak (as the term is known in the garbage collection and programming language literature). In distributed systems this also applies to stubs/scions or other representatives of remote objects. In many embodiments the garbage collector may also reclaim nodes that are no longer referenced by any (live) link. Together omitting/dropping links and garbage collection provide a means for implementing forgetting in knowledge processing systems.

(111) represents a clusterer, that is, a mechanism that causes related objects to be clustered near each other in the address space of the computer, or into the same computing node in a distributed computer.

Clustering is significantly influenced by omitting links from the index of some of the nodes that the link references. Essentially the link is no longer referenced from the node from whose index it was omitted. It will thus naturally get clustered with the node at the other end of the link (or one of its arguments, if it has more than two arguments).

Preferably the omission rules are designed in such a way that they cause most links referencing very common concepts, such as common attributes (e.g., colors), common classes in an ontology, etc., to be omitted or dropped. Thus, while the system might know thousands of people, it might not be able to enumerate everyone it knows, yet it would know for each of them that it is a person. If the omission rule specifies that only a certain number of links (of a particular type) be kept in the index, then the system might be able to enumerate a few (or a few dozen) people, but not all of them. In each case (except possibly for the ones kept in the index at "person") the link would get clustered with the individual, rather than the class "person". Preferably in such systems the individuals that are kept in the index at "person" would be in some manner "more prominent" than other links. Prominence could mean that they are individuals that are referenced more often than other individuals, or that have the most influence on the systems operation, or that are considered "well known" to the people in general. Prominence may be automatically estimated, e.g., by having the system collect statistics on how frequently each individual is used in an inference process, and using these statistics as a criterion in an inference rule.

(112) illustrates an omission rule learner, which is a subsystem for automatically learning and adjusting omission rules. It may create, delete, or modify existing omission rules.

Figure 2:
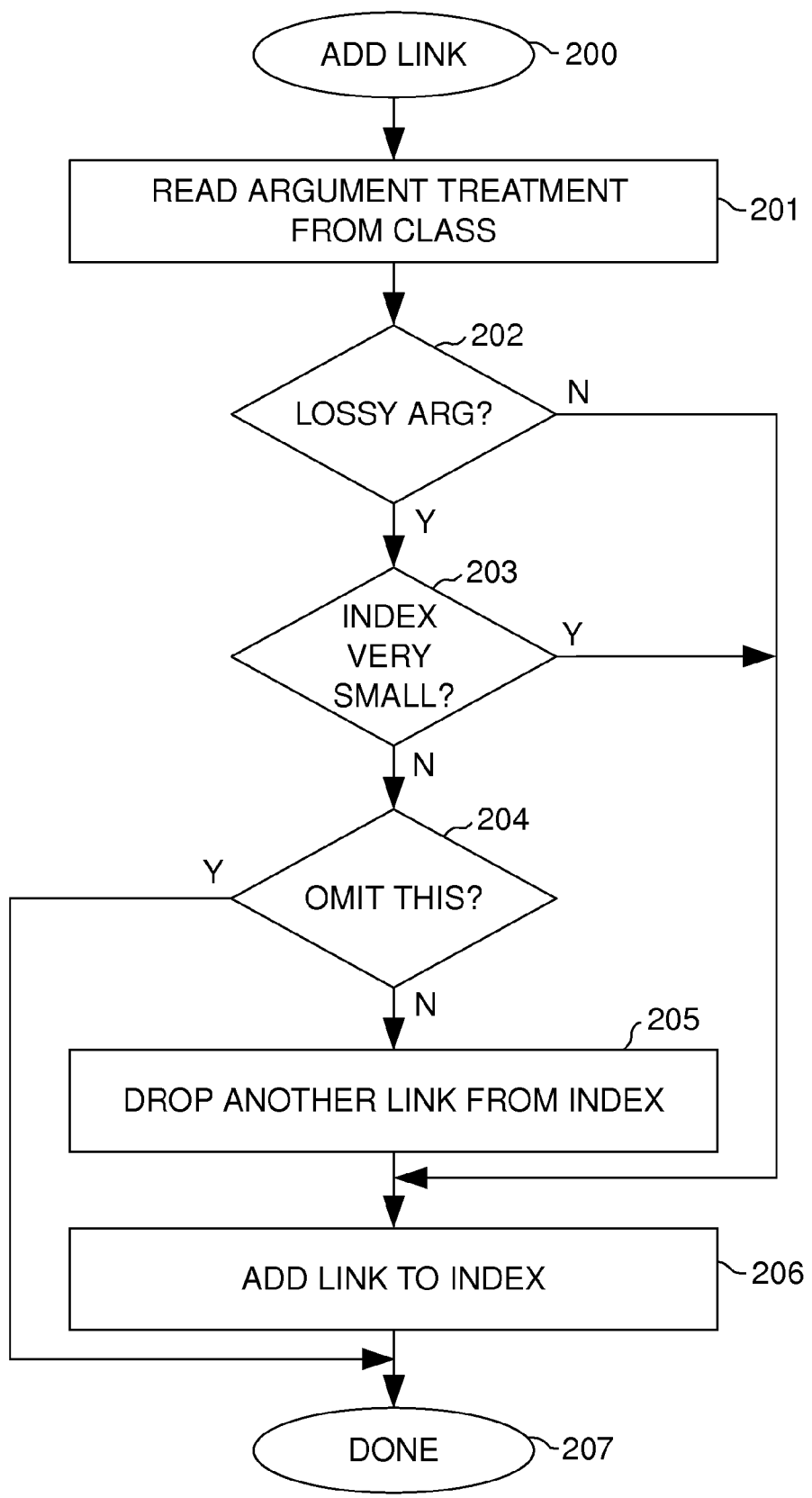
FIG. 2 illustrates adding a link to the index by an integrated index maintainer—omission rule means.

FIG. 2 illustrates an integrated index maintainer and omission rule means according to an embodiment of the invention. Starting from (200), the flowchart illustrates the actions taken when adding a link that references a node. In this example, the omission rules include never omitting except for "lossy arguments", and then only omitting if the index is not too small. Roughly the steps (201) to (204) relate to the omission rule means. Step (201) reads information about the link class (or the information could be statically configured on a per link type basis if only a fixed set of links exists), (202) determines whether the argument of the link that refers to the node that the link is associated with should be treated as "lossy". If not, then execution moves directly to adding the link to the index. If the index is "lossy", meaning that some links may be omitted from the index, execution proceeds to (203) to check if the index is so small that links should not yet be omitted from it. When coming to (204), it has been determined that the index should not grow, and (204) decides whether the current link should be omitted or whether some other link should be dropped from the index before adding the new link. (205) selects an existing link in the index and drops it from the index. (206) adds the new link to the index. (207) indicates the end of the operation.

Omission rules may use a variety of criteria to decide whether to omit a link from an index. Some examples of possible criteria include:
- references by some arguments (e.g., arg1) are treated as not lossy, and other arguments (arg2, arg3, . . . ) are treated as lossy
- link class specifies which arguments are to be treated as lossy
- size of the index
- age of the nodes referenced by the link (e.g., very new things not so easily omitted)
- number of times the nodes referenced by the link have been accessed.

The various omission rules may be combined, and may have a precedence order specified among them.

When the rules trigger an existing link to be dropped from the index, the selection of the link may be based on any suitable criteria, such as:
- random replacement
- weighted random replacement, so that more recently added ones are more likely to be replaced, possibly combined with promoting frequently accessed ones to be treated like older ones
- replacing the one that has not been used for the longest time
- replacing the one leading to a node that has not been visited for the longest time
- selecting one that is "not prominent" under any suitable definition of "prominent" (various examples were given elsewhere in this disclosure).

The inference system may be based on any known inference system for semantic networks. It may be a spreading activation system or it may be a logical inference system (e.g., theorem prover for some suitable logic). Inference may be, e.g., monotonic, non-monotonic, inductive, or abductive. Goal-oriented inference systems are used in many logic programming languages, and are suitable for use with semantic networks. Various implementation details for goal-oriented inference systems can be found in P. Kacsuk: Execution Models of Prolog for Parallel Computers, MIT Press, 1990, and G. Gupta et al: Parallel Execution of Prolog Programs, ACM Transactions on Programming Languages and Systems, 23(4):472-602, 2001, which are hereby incorporated herein by reference.

Goal-oriented inference systems typically construct (implicitly or explicitly) and-or trees of goals that need to be solved. In pure logic, the alternatives in an and-node or an or-node can be evaluated in any order. With practical logic programming languages such as Prolog that include extralogical primitives, such as I/O, additional constraints must be placed on the evaluation of alternatives at and-nodes and or-nodes, as is known in the art, to preserve the execution order of such extralogical primitives.

In an exemplary embodiment, omission rules are taken into account in a goal-oriented inference system as additional evaluation order constraints. Any goal that contains no variables can be evaluated at any time. Goals with open variables are preferably only evaluated after all other possible substitutions and evaluations have been made, and are then evaluated starting from any constants in argument positions from which links are not dropped in the applicable index. When no such starting points are present, any available constant can be selected as a starting point for evaluation (i.e., link following), but in this last case the result may not be complete (in the logical sense). If the selected node (constant) has at least some (preferably highly prominent) links in the index, then values reachable through those links may be considered by the inference procedure as possible answers. By evaluating alternative goals in such an order the inference mechanism prioritizes inference strategies that avoid trying to follow links from indexes from which some links relevant for the query have been omitted over strategies that try to follow links using such indexes.

The omission rule learner dynamically learns or adjusts omission rules. It may create new rules, delete existing ones, or modify existing rules. In some embodiments it only supports some of these operations. For example, in some embodiments the omission rule learner might only adjust specific parameters in otherwise hard-coded omission rules. It could, for example, collect statistics about how frequently a particular index is used (e.g., what link types are followed through it) or how a link type is used in inferences starting from a particular class of node and particular argument position, and if after some time it seems that such index or such links are never searched starting from some class of a node, an omission rule could be created that causes links of that type not to be added to the index in that class of node for that particular argument.

Many variations of the above described embodiments will be available to one skilled in the art. In particular, some operations could be reordered, combined, or interleaved, or executed in parallel, and many of the data structures could be implemented differently. When one element, step, or object is specified, in many cases several elements, steps, or objects could equivalently occur. Steps in flowcharts could be implemented, e.g., as state machine states, logic circuits, or optics in hardware components, as instructions, subprograms, or processes executed by a processor, or a combination of these and other techniques. The book by Kacsuk (1990) provides information on how to implement logical inference using parallel computers and special hardware.

Computer-readable media can include, e.g., computer-readable magnetic data storage media (e.g., floppies, disk drives, tapes, bubble memories), computer-readable optical data storage media (disks, tapes, holograms, crystals, strips), semiconductor memories (such as flash memory and various read-only or non-volatile memory technologies), media accessible through an I/O interface in a computer, media accessible through a network interface in a computer, networked file servers from which at least some of the content can be accessed by another computer, data buffered, cached, or in transit through a computer network, or any other media that can be read by a computer.

What is claimed is:

1. A computer comprising:
   a semantic network (104) comprising a first semantic network element (105) associated with a first index (113) and a link (106) that refers to the first semantic network element;
   an index maintainer (107,115) coupled to at least one omission rule (108,116) configured to determine for the link whether the link is to be included in an index associated with a semantic network element that the link references; and
   a clusterer (111) configured to cause related objects to be clustered near each other in an address space of the computer;

wherein the clusterer causes the link to be clustered with the first semantic network element in response to the index maintainer adding the link to the first index and omitting the link from an index associated with another node that the link refers to.

2. The computer of claim 1, wherein the semantic network elements are nodes in a semantic network.

3. The computer of claim 1, wherein the omission rule is responsive to the size of the index.

4. The computer of claim 1, wherein the omission rule is responsive to the index being lossy.

5. The computer of claim 1, wherein the omission rule is responsive to the index being associated with a semantic network element being lossy.

6. A method comprising:
 adding (206), by a computer, a link (106) referring to a first node (105) and a second node (105) in a semantic network (104), to an index (113) associated with the first node;
 omitting (204) the link from an index associated with the second node; and
 clustering the link with the first node.

7. The method of claim 6, wherein the omitting is responsive to the size of the index.

8. The method of claim 6, wherein the omitting is responsive to the index being lossy.

9. The method of claim 6, wherein the omitting is responsive to the index being associated with a node that is lossy.

10. A computer program product stored on a non-transitory computer-readable medium, comprising:
 computer readable program code means for associating at least one index with each of a plurality of nodes in a semantic network;
 computer readable program code means for adding a link to an index associated with one of the nodes the link refers to;
 computer readable program code means for omitting the link from an index associated with another one of the nodes the link refers to; and
 computer readable program code means for clustering the link with a node it refers to and from whose index the link was not omitted.

11. The computer program product of claim 10, wherein the computer program code means for omitting is responsive to the size of the index.

12. The computer program product of claim 10, wherein the computer program code means for omitting is responsive to the index being lossy.

13. The computer program product of claim 10, wherein the computer program code means for omitting is responsive to the index being associated with a network element that is lossy.

* * * * *